Patented Dec. 12, 1944

2,365,047

UNITED STATES PATENT OFFICE 2,365,047

PEST CONTROL

Euclid W. Bousquet, Wilmington, and Hubert G. Guy, Newark, Del., assignors to E. I. du Pont de Nemours & Company, Wilmington, Del., a corporation of Delaware No Drawing. Application May 29, 1941, Serial No. 395,735

9 Claims. (Cl. 167—30)

This invention relates to pest control and is particularly directed to methods and compositions for preventing or arresting infestation of pestiferous organisms, particularly insects, which are economically harmful to man and which commonly infest organic matter whether plant or animal or of plant or animal origin, either in its natural or fabricated state, which methods and compositions distinguish from the methods and compositions known heretofore in the use of a phenoxydiphenyl and the halogenated derivatives thereof as active agents of the processes and compositions.

The volume of art on diphenyl ether and its derivatives as insecticides has grown to considerable proportion with considerable emphasis on the nuclear, halogenated, nitrated, and hydroxylated classes, and isolated examples of hydrocarbon-substituted diphenyl ether. Typical of this art are U. S. Patents 1,932,595, 1,974,689, 2,044,010, 2,134,556, and 2,190,656, and German Patents 343,864, 355,206, 526,738 and 628,792. However, diphenyl ether and most of its derivatives possess relatively low toxicity toward insects and for the most part have proved unsatisfactory because the amount required to accomplish insect control produces injury to plant foliage. Diphenyl ether itself is highly volatile, odorous, and generally unsuitable for most insecticidal applications, particularly if permanency is required. Its volatility may also enhance its toxicity to humans. The large number of modifications which have been suggested to correct these disadvantages, as will appear from the prior art noted, have not been entirely satisfactory, especially in the control of chewing insects. As a rule they possess one or more of the foregoing disadvantages and for the most part do not satisfactorily inhibit feeding of chewing insects such as leaf-eating insects and clothes moths.

We have now found that compounds selected from the class of the phenoxydiphenyls and the halogenated derivatives thereof are highly effective active ingredients for pest control and are particularly suitable for prevention of feeding in the control of chewing insects. This invention is accordingly directed to pest control compositions and methods in which these products are the essential active agents.

The pest control agents of this invention may be prepared by well known synthetic methods from relatively cheap raw materials and thus are particularly attractive as competitive pest control agents. Two alternative methods may be used to advantage. Thus a phenoxydiphenyl may be prepared by reacting a halogenated benzene with a metal salt of a phenyl phenol in the presence of copper, or it may be prepared by reacting a sodium phenolate with a halogenated diphenyl in the presence of copper. These reactions are preferably carried out at elevated temperatures of the order of 200–350° C. and may be expedited by the use of pressure. There may be produced three different isomers, the ortho, para and meta, or mixtures thereof. Any other suitable method may be used and the mono and polychlorinated derivatives may be obtained in a like manner or by chlorinating the phenoxydiphenyl. The products are all very soluble in acetone, carbon tetrachloride, benzene, and ether. Typical properties of representative compounds are shown in the following table:

TABLE

|  | Phenoxy-diphenyl | X-chloro (phenoxy-diphenyl) | X-dichloro (phenoxy-diphenyl) |
|---|---|---|---|
| B. P./10 mm. °C | 209 | >180 | 222 |
| F. P. °C | 27.6 | −10 | >0 |
| Sp. gr | 30/25° C. 1.109 | 25/25° C. 1.162 | 25/25° C. 1.2333 |
| Solubility in CH³OH (25° C.) percent | 17 | 23 | 14 |

The pest control agents of this invention may be prepared in suitable compositions according to their intended use. The high efficiency of certain typical compounds as given in the table in various applications is illustrated in the following examples:

Example 1

Phenoxydiphenyl may be diluted with talc and applied as a dust. This compound or the chlorinated derivatives, both the mono and dichloro (phenoxydiphenyls), are dissolved in acetone and added to sufficient quantity of talc to give the desired concentration of dust to be applied, and subsequently evaporated while stirring.

A 0.5% dust made up in this way with phenoxydiphenyl gave a 90% kill of Mexican bean beetle larvae and allowed only 10% feeding on the bean foliage on which the material was dusted. These results show superiority over a calcium arsenate control at the same concentration which gave an 80% kill and a 5–10% feeding.

A similar 1% talc dust of the X-monochloro (phenoxy-diphenyl), when dusted on bean foliage, killed 63% of the Mexican bean beetle larvae and allowed only 5% feeding on the foliage, whereas the calcium arsenate control gave only a 30% kill and allowed 10% feeding. No foliage injury was observed in any of the applications.

A 1% dust of diphenyl ether, on the other hand, gave only 50% kill of Mexican bean beetle larvae and allowed 75% feeding as compared with 100% kill and 1% feeding for calcium arsenate.

Similarly hexachlorodiphenyl ether applied as an aqueous spray at 1 to 200 killed 30% of adult Mexican bean beetle and allowed 25% of the foliage to be eaten, whereas calcium arsenate under the same conditions killed 90% and allowed 1% foliage to be eaten.

*Example 2*

The above materials are also useful in impregnating woolen fabrics for protection against the ravages of clothes moth larvae and other insects harmful to various animal fibers. They may be incorporated in dry cleaning solvents such as Stoddard solvent or may be incorporated in other solvents, e. g., acetone, for application to the fabric by dipping or spraying the fabric until satisfactory impregnation is attained.

Woolen fabric impregnated in this manner with a 2% acetone solution of phenoxydiphenyl and exposed to the destructive effect of clothes moth larvae was protected from practically any damage (3%), whereas an untreated check fabric allowed a 50% damage and gave no mortality. The phenoxydiphenyl-treated sample furthermore killed 100% of the moth larvae.

Similar applications of the chlorinated derivatives in 4.5% acetone solution killed 95% of the larvae and allowed only 1 or 2% damage to the fabric, whereas the untreated check fabric in this series of experiments killed none of the larvae which caused a damage of at least 35% to the fabric surface.

In similar tests in which diphenyl ether and hexachlorodiphenyl ether were applied from 2% solutions in acetone the former gave 5% kill and allowed 65% feeding and the latter gave 60% kill and allowed 20% feeding under conditions in which the untreated check was consumed 60-80%, respectively, and none of the moths died.

While suitably representative compositions have been set forth it is to be understood that the invention is in no wise limited thereto but that the active ingredient may be formulated in various types of compositions for use as dusts or aqueous sprays or in suitable organic solvents.

They may be used in various combinations with such auxiliary materials as spreaders, stickers, and other toxicants; for example, insecticides such as metallic arsenates, fluosilicates, phenothiazines, organic thiocyanates such as n-dodecyl and butyl carbitol thiocyanates, nicotine, anabasine (neo-nicotine) nor-nicotine, rotenone and its congeners, hellebore, pyrethrum, isobutylundecylenamide, aminomethyl sulfides, and bactericides and fungicides such as sulfur, polysulfides such as lime-sulfur, the chlorinated phenols, aminomethyl sulfides, copper acyl acetonates, copper chelates of beta-keto acids, copper chelates of salicylaldehyde, Burgundy mixture, Bordeaux mixture, the quaternary ammonium halides, and derivatives of dithiocarbamic acid such as ferric dimethyl dithiocarbamate. They may be used in the form of aqueous sprays, dusts or solutions, dispersed with wetting agents such as the alkali metal, or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophillite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesion and sticking materials such as rosin and glue and various other common adjuvants such as lime may be used.

We claim:

1. An insect control composition containing as an essential active ingredient a compound selected from the class consisting of phenoxydiphenyl and the mono- and di-halogenated derivatives thereof and a carrier therefor.

2. An insecticidal composition adapted to inhibit feeding of chewing insects containing as an essential active ingredient phenoxydiphenyl and a carrier therefor.

3. The method of protecting organic matter from the attack of chewing insects which comprises treating the material with a substance selected from the class consisting of phenyl xenyl ether and its halogenated derivatives.

4. The method of protecting organic matter from the attack of chewing insects which comprises treating the material with phenyl xenyl ether.

5. The method of mothproofing fabric which comprises impregnating the fabric with a substance selected from the class consisting of phenoxydiphenyl and its halogenated derivatives.

6. The method of mothproofing fabric which comprises impregnating the fabric with phenoxydiphenyl.

7. An insecticidal composition adapted to inhibit feeding of chewing insects containing as an essential active ingredient a compound selected from the class consisting of phenyl xenyl ether and its halogenated derivatives and a carrier therefor.

8. The method of protecting foliage from the attack of chewing insects which comprises treating the foliage with a substance selected from the class consisting of phenyl xenyl ether and its halogenated derivatives.

9. The method of protecting foliage from the attack of chewing insects which comprises treating the foliage with phenyl xenyl ether.

EUCLID W. BOUSQUET.
HUBERT G. GUY.